US 9,229,560 B2

(12) United States Patent
Kang et al.

(10) Patent No.: US 9,229,560 B2
(45) Date of Patent: Jan. 5, 2016

(54) FLEXIBLE TOUCH SCREEN PANEL

(71) Applicant: Samsung Display Co., LTD., Yongin, Gyeonggi-do (KR)

(72) Inventors: Sung-Ku Kang, Yongin (KR);
Byeong-Kyu Jeon, Yongin (KR);
Hee-Woong Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 72 days.

(21) Appl. No.: 14/012,973

(22) Filed: Aug. 28, 2013

(65) Prior Publication Data
US 2014/0211102 A1 Jul. 31, 2014

(30) Foreign Application Priority Data

Jan. 29, 2013 (KR) .................. 10-2013-0010002

(51) Int. Cl.
*G06F 3/041* (2006.01)
*G06F 1/16* (2006.01)
*G06F 3/044* (2006.01)

(52) U.S. Cl.
CPC .............. *G06F 3/041* (2013.01); *G06F 1/1652* (2013.01); *G06F 3/044* (2013.01); *G06F 3/0412* (2013.01); *G06F 2203/04102* (2013.01); *G06F 2203/04103* (2013.01)

(58) Field of Classification Search
CPC ............ G06F 3/044; G06F 3/041; G06F 2203/04102; G06F 1/1652; G06F 2203/04103; G06F 3/0412
USPC .................................. 345/173–178
See application file for complete search history.

(56) References Cited

U.S. PATENT DOCUMENTS

| 7,948,477 | B2* | 5/2011 | Hotelling | 345/173 |
| 8,217,902 | B2 | 7/2012 | Chang et al. | |
| 8,345,020 | B2 | 1/2013 | Jeong et al. | |
| 8,629,842 | B2* | 1/2014 | Jang | 345/173 |
| 8,743,078 | B2* | 6/2014 | Kim | 345/174 |
| 8,822,865 | B2* | 9/2014 | Hwang et al. | 200/600 |
| 2005/0030048 | A1* | 2/2005 | Bolender et al. | 324/661 |
| 2008/0277259 | A1* | 11/2008 | Chang | 200/600 |
| 2009/0002331 | A1* | 1/2009 | Kamiya et al. | 345/173 |
| 2010/0013745 | A1* | 1/2010 | Kim et al. | 345/76 |
| 2010/0123670 | A1* | 5/2010 | Philipp | 345/173 |
| 2010/0164890 | A1* | 7/2010 | Lee et al. | 345/173 |
| 2010/0214247 | A1* | 8/2010 | Tang et al. | 345/173 |

(Continued)

FOREIGN PATENT DOCUMENTS

KR 10-2010-0084261 A 7/2010
KR 10-2012-0092004 A 8/2012

*Primary Examiner* — Dmitriy Bolotin
(74) *Attorney, Agent, or Firm* — Christie, Parker & Hale, LLP

(57) ABSTRACT

A flexible touch screen panel includes a flexible substrate; a plurality of first sensing cells on a surface of the substrate and arranged along a first direction, and a plurality of second sensing cells on the surface of the substrate and arranged along a second direction crossing the first direction; and a plurality of first coupling patterns configured to couple adjacent ones of the first sensing cells along the first direction, and a plurality of second coupling patterns configured to couple adjacent ones of the second sensing cells along the second direction, wherein the first and second sensing cells form meshes having a plurality of apertures, and the first coupling patterns have a lamination structure including different materials.

15 Claims, 3 Drawing Sheets

(56) References Cited

U.S. PATENT DOCUMENTS

| | | | |
|---|---|---|---|
| 2011/0007011 A1* | 1/2011 | Mozdzyn | 345/173 |
| 2011/0018838 A1* | 1/2011 | Lee | 345/174 |
| 2011/0102370 A1* | 5/2011 | Kono et al. | 345/174 |
| 2011/0148781 A1* | 6/2011 | Chen et al. | 345/173 |
| 2011/0157086 A1* | 6/2011 | Ozeki et al. | 345/174 |
| 2011/0169769 A1* | 7/2011 | Takahashi | 345/174 |
| 2011/0227838 A1* | 9/2011 | Jeon et al. | 345/173 |
| 2011/0267308 A1* | 11/2011 | Park et al. | 345/174 |
| 2011/0279401 A1* | 11/2011 | Hong et al. | 345/174 |
| 2011/0290631 A1* | 12/2011 | Kuriki | 200/600 |
| 2011/0291983 A1* | 12/2011 | Yao | 345/174 |
| 2012/0062250 A1* | 3/2012 | Kuo | 324/686 |
| 2012/0081333 A1* | 4/2012 | Ozeki et al. | 345/174 |
| 2012/0105337 A1* | 5/2012 | Jun et al. | 345/173 |
| 2012/0127095 A1* | 5/2012 | Jun | 345/173 |
| 2012/0212432 A1* | 8/2012 | Murata et al. | 345/173 |
| 2012/0234663 A1* | 9/2012 | Hwang et al. | 200/600 |
| 2012/0256878 A1* | 10/2012 | Hashimoto et al. | 345/174 |
| 2013/0057495 A1* | 3/2013 | Wang et al. | 345/173 |
| 2013/0153030 A1* | 6/2013 | Accardi et al. | 136/259 |
| 2013/0181910 A1* | 7/2013 | Yilmaz et al. | 345/173 |
| 2013/0219679 A1* | 8/2013 | Cok | 29/25.41 |
| 2013/0278511 A1* | 10/2013 | Kang et al. | 345/173 |
| 2013/0278513 A1* | 10/2013 | Jang | 345/173 |
| 2013/0293096 A1* | 11/2013 | Kang et al. | 313/511 |
| 2014/0055383 A1* | 2/2014 | Kim et al. | 345/173 |
| 2014/0069796 A1* | 3/2014 | Kang et al. | 200/600 |
| 2014/0111442 A1* | 4/2014 | Cok et al. | 345/173 |
| 2014/0145977 A1* | 5/2014 | Kang | 345/173 |
| 2014/0152910 A1* | 6/2014 | Kang et al. | 349/12 |
| 2014/0168109 A1* | 6/2014 | Kang et al. | 345/173 |
| 2014/0253495 A1* | 9/2014 | Kang et al. | 345/174 |

* cited by examiner

FLEXIBLE TOUCH SCREEN PANEL

CROSS-REFERENCE TO RELATED APPLICATION

This application claims priority to and the benefit of Korean Patent Application No. 10-2013-0010002, filed on Jan. 29, 2013 in the Korean Intellectual Property Office, the entire content of which is incorporated herein by reference.

BACKGROUND

1. Field

The following description relates to a touch screen panel.

2. Description of the Related Art

A touch screen panel is an input device capable of selecting a content indicator displayed on a screen of an image display device using a human hand or an object to input the command of a user.

The touch screen panel is provided on a front face of the image display device to convert a contact position of the human hand or the object into an electrical signal. Therefore, the content indicator selected at the contact position is received as an input signal.

Because the touch screen panel may replace an additional input device coupled to the image display device, such as a keyboard and/or a mouse, the range of use of touch screen panels is gradually increasing.

Methods of operating a touch screen panel include a resistance layer method, a photo-sensing method, and an electro-capacitive method. Among the above methods, the widely used electro-capacitive touch screen panel senses a change in capacitance in an area formed by conductive sensing cells along with other peripheral sensing cells when the human hand or the object, such as a stylus pen, contacts the touch screen panel to convert the contact position into the electrical signal.

For this purpose, the electro-capacitive touch screen panel includes first sensing cells formed along a first direction, second sensing cells formed along a second direction, first coupling patterns for coupling the adjacent first sensing cells along the first direction, and second coupling patterns for coupling the adjacent second sensing cells along the second direction.

The touch screen panel is commonly attached to an external surface of an image display device, such as a liquid crystal display (LCD) or an organic light emitting display. Therefore, high transparency and thin-film characteristics are required. In particular, the touch screen panel is designed so that the sensing cells and the coupling patterns are not visible to a user.

Recently, a flexible image display device has begun development. Therefore, the touch screen panel attached onto the flexible image display device must be flexible as well.

In a conventional touch screen panel, sensing cells are formed of a transparent, conductive material, such as indium tin oxide (ITO). However, in this case, when the conventional touch screen panel is curved or folded, cracks will be generated in the sensing cells such that the operation of the touch screen panel may be negatively affected.

In addition, in the conventional touch screen panel, because a thin-film forming process and a pattern forming process are required to form the sensing cells, high heat resistance and chemical resistance are also required. Therefore, the sensing cells are usually formed on a glass substrate suitable for these processes.

However, in this case, because the glass substrate must have a thickness no less than a uniform value such that the glass substrate may be produced, the glass substrate cannot be formed to have a sufficiently small thickness or be flexible.

In order to apply the conventional touch screen panel to the flexible image display device, use of a flexible thin film such as polyethylene terephthalate (PET) as the substrate of the touch screen panel has been suggested. However, controlling the area and/or width of the sensing cells and coupling patterns formed on the thin film is difficult. In particular, because the coupling patterns are formed to have a width less than a width of the sensing cells, electrical transmittance and a low surface resistance condition (e.g., a predetermined surface resistance condition) must be ensured.

When the conventional touch screen panel is manufactured using the glass substrate, the first or second coupling patterns are formed of an opaque metal in the form of a wire. However, when the flexible touch screen panel is manufactured using the thin film, it is difficult to perform the high temperature process due to the flexible thin-film material having lower heat resistance, such that the high temperature process is limited, thereby causing the width of the coupling patterns to be increased.

Therefore, in the flexible touch screen panel, the coupling patterns are visible, and preventing the coupling patterns of the flexible touch screen panel from being visible is desired.

SUMMARY

Accordingly, aspects of embodiments of the present invention are directed toward a flexible touch screen panel in which sensing cells, such as touch sensors, are located on (e.g., formed on) one surface of a flexible substrate, and the sensing cells are formed as ductile, conductive meshes so that flexibility may be ensured and thickness may be reduced.

Aspects of embodiments of the present invention are directed toward a flexible touch screen panel in which coupling patterns for coupling the adjacent sensing cells are formed as a lamination structure of different (e.g., various) materials, such that it is possible to create a low surface resistance condition of the coupling patterns and to prevent the coupling patterns from being visible.

According to an embodiment of the present invention, a flexible touch screen panel includes a flexible substrate, a plurality of first sensing cells on a surface of the substrate and arranged along a first direction and a plurality of second sensing cells on the surface of the substrate and arranged along a second direction crossing the first direction, and a plurality of first coupling patterns configured to couple adjacent ones of the first sensing cells along the first direction and a plurality of second coupling patterns configured to couple adjacent ones of the second sensing cells along the second direction, wherein the first and second sensing cells form meshes having a plurality of apertures, and the first coupling patterns have a lamination structure including different materials.

The first and second sensing cells may include an opaque metal.

The opaque metal may include at least one low resistance metal of silver (Ag), aluminum (Al), copper (Cu), chromium (Cr), and nickel (Ni), or a nanometal conductive layer.

The flexible substrate may include a low retardation film including one of a casted polycarbonate (PC) film or a cyclic polyolefin (COP) film.

The flexible substrate may include one of a polycarbonate (PC) film, an oriented polypropylene (OPP) film, or a polyvinyl alcohol (PVA) film having a phase difference.

Each of the first coupling patterns may include a first bridge pattern including a transparent, conductive material having a first width and a second bridge pattern on the first bridge pattern and including an opaque metal having a second width.

The second width of the second bridge pattern may be less than the first width of the first bridge pattern.

The second bridge pattern may have substantially the same length as that of the first bridge pattern.

The second bridge pattern may further include protrusions extending along a direction substantially parallel to the second width of the second bridge pattern at both ends of the second bridge pattern.

A length of each of the protrusions of the second bridge pattern may be substantially the same as the first width of the first bridge pattern.

An insulating layer may be on at least a portion of one surface of each of the first coupling patterns such that both ends of each first coupling pattern are exposed.

A length of the insulating layer may be less than a length of the first bridge pattern, and a width of the insulating layer may be greater than the first width of the first bridge pattern.

Both ends of each first coupling pattern may contact protrusions of adjacent ones of the first sensing cells.

The insulating layer may insulate each of the second coupling patterns from a corresponding one of the first coupling patterns, and each of the second coupling patterns may be coupled with corresponding ones of the second sensing cells.

The second bridge pattern may have substantially the same length as that of the insulating layer and may be beneath the insulating layer.

According to aspects of embodiments of the present invention, sensing cells as touch sensors are formed on one surface of a flexible thin film and the sensing cells are formed as ductile, conductive meshes so that a flexible characteristic may be ensured and a thickness may be reduced.

In addition, coupling patterns for coupling the adjacent sensing cells have a lamination structure of different (e.g., various) materials, so that the coupling patterns have a low surface resistance condition, and to prevent the coupling patterns from being visible.

BRIEF DESCRIPTION OF THE DRAWINGS

The accompanying drawings, together with the specification, illustrate example embodiments of the present invention and, together with the description, serve to better explain the principles of the present invention.

DETAILED DESCRIPTION

Figure 1:
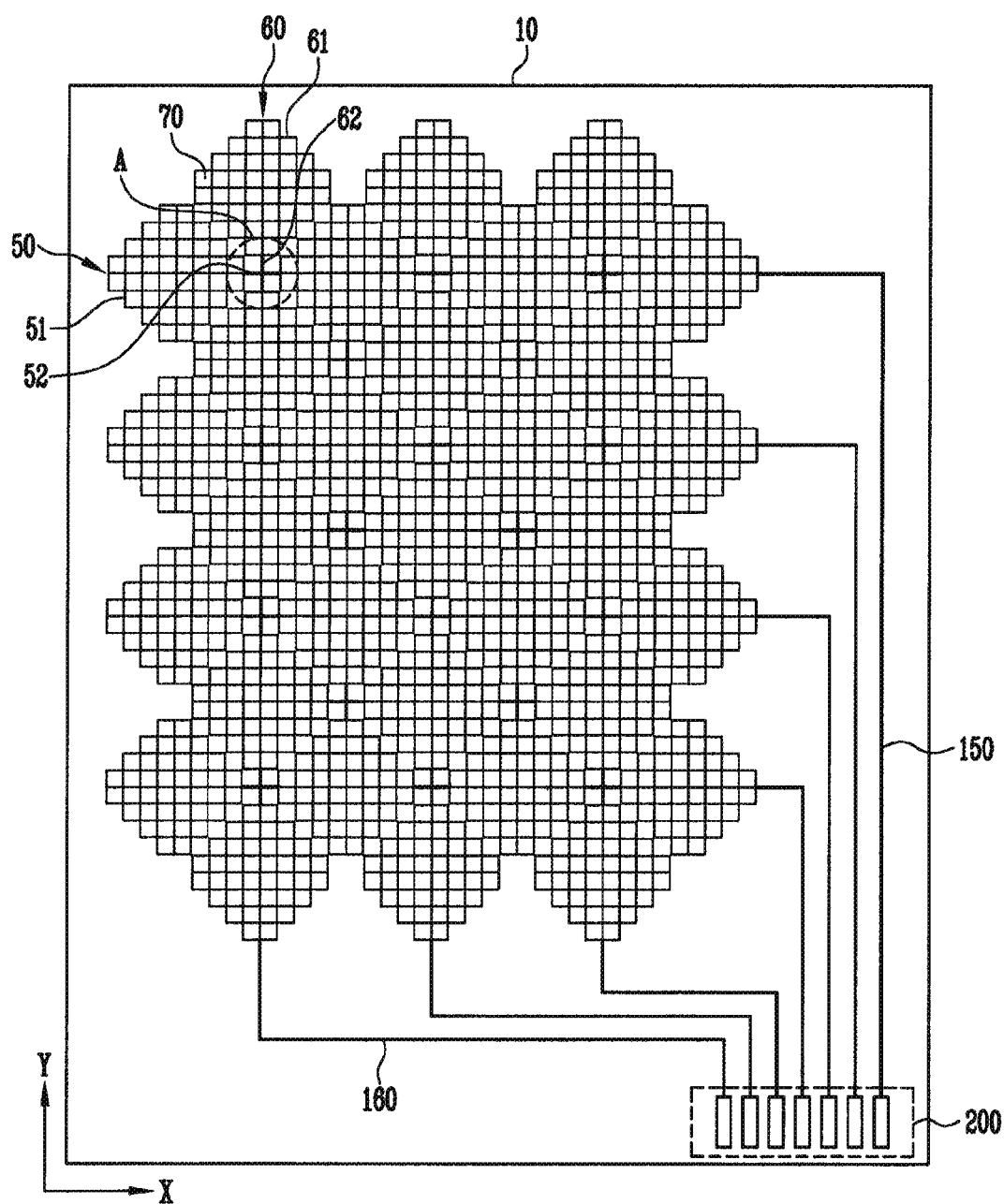
FIG. 1 is a plan view illustrating a touch screen panel according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to or coupled to the another element or be indirectly connected to or coupled to the another element with one or more intervening elements interposed therebetween. Hereinafter, like reference numerals refer to like elements.

Hereinafter, embodiments of the present invention will be described in detail with reference to the accompanying drawings.

FIG. 1 is a plan view illustrating a touch screen panel according to an embodiment of the present invention.

Referring to FIG. 1, a touch screen panel according to the embodiment of the present invention includes a flexible substrate 10, first and second sensing cells 50 and 60 located at (e.g., formed on) one surface of the substrate 10, and first and second position detecting lines 150 and 160 coupling the first and second sensing cells 50 and 60, respectively, to an external touch driving circuit (not shown) through a pad unit 200.

As illustrated in FIG. 1, the first sensing cells 50 may extend in a first direction (e.g., be longitudinally formed in a first direction) (for example, an X-axis direction) and be arranged in a second direction (for example, a Y-axis direction) that crosses or intersects the first direction (e.g., is perpendicular to the first direction).

In addition, the second sensing cells 60 may extend in the second direction (e.g., be longitudinally formed in the second direction) and be arranged in the first direction.

The sensing cells 50 and 60, according to this embodiment of the present invention, may be formed of a ductile, opaque, conductive material, instead of a transparent, conductive material (for example, indium tin oxide (ITO)) of which conventional sensing cells are generally formed, to prevent cracks from being generated in the sensing cells and to prevent the operation of the flexible touch screen panel from being negatively affected when it is curved or folded.

Here, the conductive material of which the sensing cells 50 and 60 are formed may include a low resistance metal, such as, for example, silver (Ag), aluminum (Al), copper (Cu), chromium (Cr), and nickel (Ni), or a nanometal conductive layer such as a silver nanowire, as an opaque metal. However, the present invention is not limited to the above.

Because ITO, which is generally used in conventional sensing cells, lacks flexibility, when the sensing cells formed of ITO are applied to a flexible touch screen panel, cracks may be easily generated. However, when the opaque metal is used, such as in this embodiment of the present invention, fewer cracks may be generated than in the conventional sensing cells where ITO is used. Therefore, the sensing cells formed of the opaque metal may be easily applied to flexible touch screen panels.

In addition, when the sensing cells 50 and 60 are formed of a metal having lower resistance than that of ITO, resistive-capacitive (RC) delay is reduced.

However, when the sensing cells 50 and 60 are formed of the opaque metal, unique metallic reflection glossiness and surface reflectance increase such that a user may see or recognize the metal, and therefore, it is difficult to manufacture a high definition product.

According to the embodiment of the present invention, in order to overcome such a drawback, a flexible polarizing film (not shown) is located at (e.g., formed on) the substrate 10 on which the sensing cells 50 and 60 are formed to remove metallic reflection glossiness, to reduce reflectance, and to prevent the sensing cells from being visible.

Here, the substrate 10 on which the sensing cells are located (e.g., formed) is a low retardation film positioned under the polarizing film, is flexible, and may be a casted polycarbonate (PC) film or a cyclic polyolefin (COP) film.

In another embodiment, the substrate 10 may function as a phase difference film provided in the polarizing film. In this case, the substrate 10 may be a polycarbonate (PC) film, an oriented polypropylene (OPP) film, or a poly vinylalcohol (PVA) film having a phase difference (e.g., performing a phase difference function).

In addition, according to the embodiment shown in FIG. 1, in order to use the opaque, conductive material in the sensing cells, the sensing cells 50 and 60 are formed as meshes.

Specifically, referring to FIG. 1, the first sensing cells 50 are formed as meshes 51 and are arranged in the first direction. Adjacent first sensing cells 50 arranged in a same line are electrically coupled to each other through first coupling patterns 52.

The second sensing cells 60 are formed as meshes 61 and are arranged in the second direction. Adjacent second sensing cells 60 arranged in a same line are electrically coupled to each other through second coupling patterns 62.

Because the first and second sensing cells 50 and 60 are formed as meshes 51 and 61, a plurality of apertures 70 are formed between the first and second sensing cells 50 and 60. In FIG. 1, the aperture 70 is square for convenience sake. However, embodiments of the present invention are not limited to the above.

For instance, the first and second sensing cells 50 and 60 may have a diamond shape. However, the shape of the sensing cells 50 and 60 according to this embodiment of the present invention is not limited to the above.

Generally, a display device including a plurality of pixels arranged to display an image is located under (e.g., arranged under) the substrate 10 on which the sensing cells 50 and 60 are formed. In this case, when the shape and arrangement of the sensing cells have regularity, a Moiré phenomenon may be generated by interference with the pixels in the display device, and display quality may be negatively affected. The frames of the sensing cells 50 and 60 may be randomly curved in order to reduce the occurrence of such a problem or phenomenon.

According to the embodiment of the present invention shown in FIG. 1, for convenience sake, the sensing cells 50 and 60 are formed having a diamond shape.

In addition, first position detecting lines 150 are coupled to an end of each last first sensing cell 50 in the first direction, second position detecting lines 160 are coupled to an end of each last second sensing cell 60 in the second direction, and the first position detecting lines 150 and the second position detecting lines 160 may transmit signals generated by (e.g., detected by) the sensing cells 50 and 60 to an external touch driving circuit (not shown) through the pad unit 200.

That is, the external touch driving circuit that receives the signals through the first position detecting lines 150 and the second position detecting lines 160 may register a touch position of a user or an object.

The first position detecting lines 150 may be formed of the same material as that of the first sensing cells 50 coupled thereto, and the second position detecting lines 160 may be formed of the same material as that of the second sensing cells 60 coupled thereto.

Because the position detecting lines 150 and 160 may be formed by the same process as that of the sensing cells 50 and 60, the processes may be simplified.

In addition, according to this embodiment of the present invention, the first and second sensing cells 50 and 60 are formed on the same surface of the substrate 10.

As described above, when the first and second sensing cells 50 and 60 are formed on the same surface of the substrate 10, crossings or intersections of the first coupling patterns 52 where the adjacent first sensing cells 50 are coupled and the second coupling patterns 62 where the adjacent second sensing cells 60 are coupled must be insulated (e.g., insulated from each other).

In FIG. 1, in a region A where the first coupling pattern 52 and the second coupling pattern 62 cross or intersect each other, an insulating layer is not illustrated and only the crossing or intersection of the first and second coupling patterns 52 and 62 is illustrated for convenience sake. At least one of the first coupling pattern 52 and the second coupling pattern 62 is not formed with (e.g., integrated in) the sensing cells 50 and 60, respectively, but is instead formed as a bridge with the insulating layer (not shown) interposed therebetween (e.g., interposed between the first and second coupling patterns 52 and 62).

For example, when the second coupling pattern 62 is integrated with the second sensing cells 60, the first coupling pattern 52 is formed as a bridge (e.g., a separated bridge) insulated by the insulating layer which is formed in a region where the second coupling pattern 62 overlaps the first coupling pattern 52 which electrically couple the first sensing cells 50 to each other.

Here, the first coupling pattern 52, formed as a bridge, may be formed of the same material as that of the sensing cells 50 and 60, that is, an opaque metal with low surface resistance. However, in this case, to prevent unwanted visibility, a width of the first coupling pattern 52 may be limited. In addition, when the width of the first coupling pattern 52, formed as a bridge, is limited, the coupling pattern may not contact the adjacent first sensing cells 50 due to an alignment tolerance (e.g., an align allowance).

However, when the first coupling pattern 52, formed as a bridge, is formed of a transparent, conductive material, the width of the first coupling pattern 52 may be increased to overcome the above limitation or drawback. However, in this case, operation may be negatively affected due to high surface resistance of the transparent, conductive material.

Therefore, according to this embodiment of the present invention, the coupling patterns for coupling the adjacent sensing cells are formed as a lamination structure of different (e.g., various) materials so that it is possible for the coupling patterns to have a low surface resistance condition and to prevent the coupling patterns from being visible.

Figure 2A:
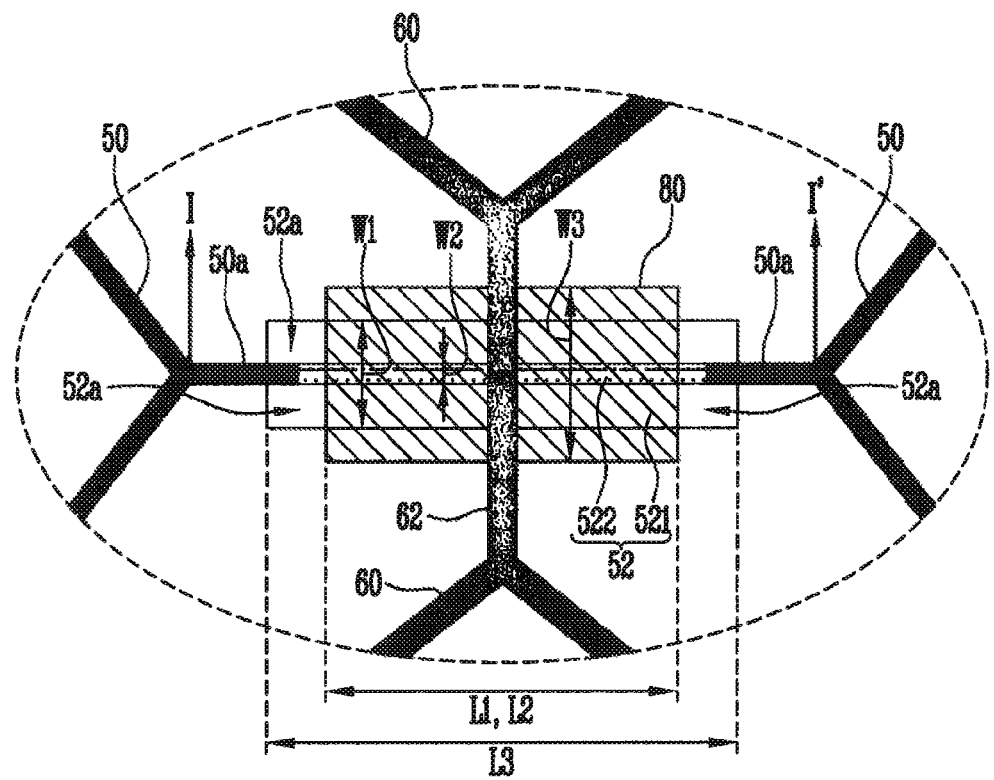
FIGS. 2A and 2B are a plan view and a sectional view illustrating the specific region A of FIG. 1.
Figure 2B:
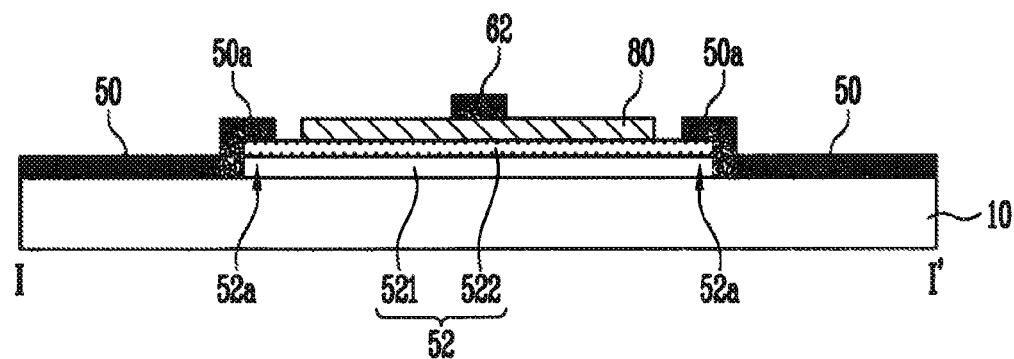

FIGS. 2A and 2B are a plan view and a sectional view of the specific region of FIG. 1, that is, the region A in which the first coupling pattern 52 and the second coupling pattern 62 cross or intersect each other. Hereinafter, an embodiment of the present invention will be described in detail with reference to FIGS. 2A and 2B.

In FIGS. 2A and 2B, the second coupling pattern 62 is formed with (e.g., integrated in) the second sensing cells 60, and the first coupling pattern 52 is formed as a bridge. However, embodiments of the present invention are not limited to the above.

As illustrated in FIGS. 2A and 2B, the first coupling pattern 52 includes a first bridge pattern 521 formed of a transparent, conductive material having a first width W1 and a second bridge pattern 522 coupled to (e.g., laminated on) the first bridge pattern 521 and formed of an opaque metal having a second width W2.

In the embodiment illustrated in FIGS. 2A and 2B, a length L3 of the first bridge pattern 521 is greater than a length L2 of the second bridge pattern 522.

In addition, an insulating layer 80 (e.g., an island-shaped insulating layer 80) is formed on or over the first coupling pattern 52, which includes the first and second bridge patterns 521 and 522, such that both ends 52a of the first coupling pattern 52 are exposed (i.e., not covered by the insulating layer 80).

Referring to FIG. 2A, the insulating layer 80 may be formed as a rectangle. A length L1 of the insulating layer 80 is less than the length L3 of the first bridge pattern 521, and a width W3 of the insulating layer 80 is greater than the width W1 of the first bridge pattern 521.

The insulating layer 80 is not necessarily formed as a rectangle and may be formed as a polygon having a length less than the length L3 of the first bridge pattern 521 and/or a width greater than the width W1 of the first bridge pattern 521, or as a circle, or as an ellipse.

The both ends 52a of the first coupling pattern 52 contact protrusions 50a of the adjacent first sensing cells 50, as illustrated. Therefore, the adjacent first sensing cells 50 arranged along the same line (for example, a row) in the first direction are electrically coupled to each other through the first coupling pattern 52.

In addition, the second coupling pattern 62 is formed on or over the insulating layer 80 formed on the first coupling pattern 52, and the second sensing cells 60 are formed with (e.g., integrated in) the second coupling pattern 62, that is, the adjacent second sensing cells 60 arranged along the same line (for example, a column) in the second direction are electrically coupled to each other through the second coupling pattern 62.

According to this embodiment of the present invention, although positions of the protrusions 50a of the first sensing cells 50 may be shifted in relation to the first bridge pattern 521 having the width W1 due to the alignment tolerance (e.g., align allowance), the protrusions 50a of the first sensing cells may still contact the ends 52a of the first coupling pattern 52 which corresponds to the width W1 of the first bridge pattern 521.

In the embodiment shown in FIGS. 2A and 2B, the protrusions 50a of the first sensing cells 50 are positioned or located at the center of the first coupling pattern 52 and electrically coupled to the second bridge pattern 522. However, embodiments of the present invention are not limited to the above. That is, although the positions or locations of the protrusions 50a of the first sensing cells 50 may be shifted due to the alignment tolerance (e.g., align allowance), the protrusions 50a of the first sensing cells 50 may still contact at least the first bridge pattern 521.

In addition, negative effects due to the first bridge pattern 521 being formed of a transparent, conductive material and therefore having high surface resistance are overcome by the second bridge pattern 522 being formed of an opaque metal and formed on (e.g., laminated on) the first bridge pattern 521.

That is, although the first sensing cells 50 may be electrically coupled to the first bridge pattern 521, a sensing signal is transmitted between adjacent first sensing cells 50 through the second bridge pattern 522 having low resistance, such that a possibility of a defective operation being caused by the high surface resistance of the first bridge pattern 521 is reduced.

In addition, because it is necessary to consider only the alignment tolerance (e.g., align allowance) and it is not necessary to consider the surface resistance, the width of the first bridge pattern 521 may be reduced in comparison with that of a bridge pattern formed of the transparent, conductive material. Therefore, the width of the insulating layer 80 may also be reduced.

In addition, the width W2 of the second bridge pattern 522 may be reduced in comparison with that of a bridge pattern formed of only the opaque metal because it is not necessary to consider the alignment tolerance (e.g., align allowance). Therefore, it is possible to prevent the second bridge pattern 522 from being visible.

Figure 3A:
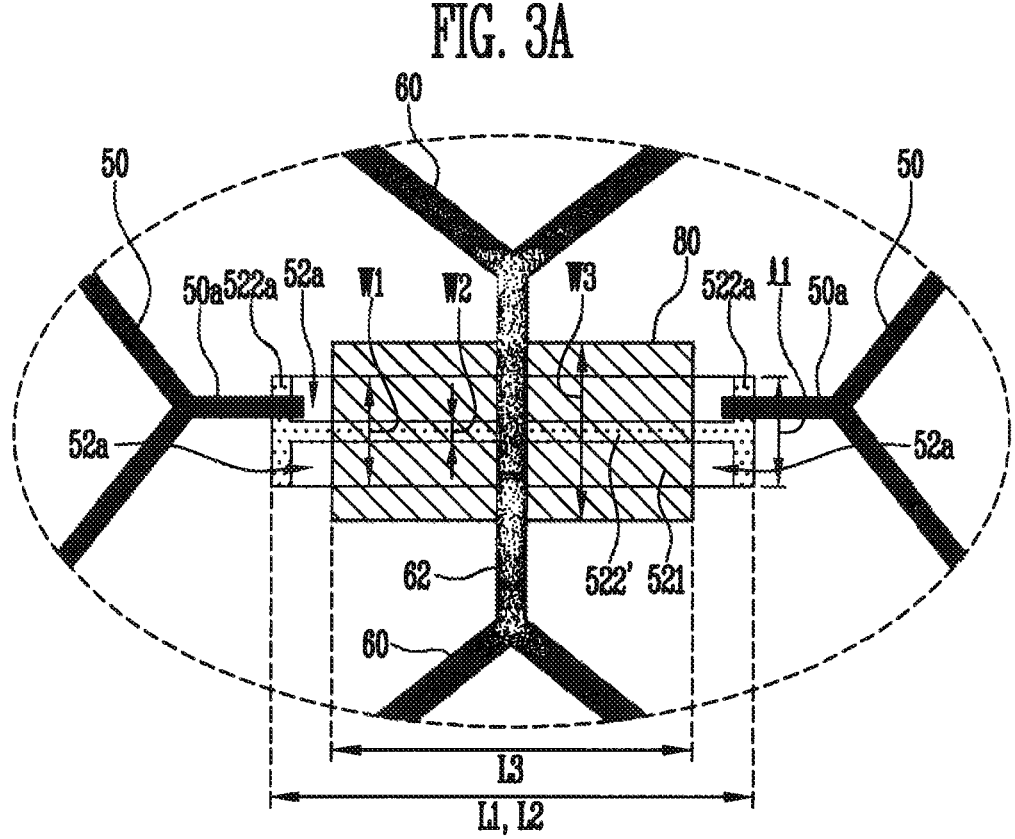
FIGS. 3A and 3B are plan views illustrating the specific region A of FIG. 1 according to other embodiments of the present invention.
Figure 3B:
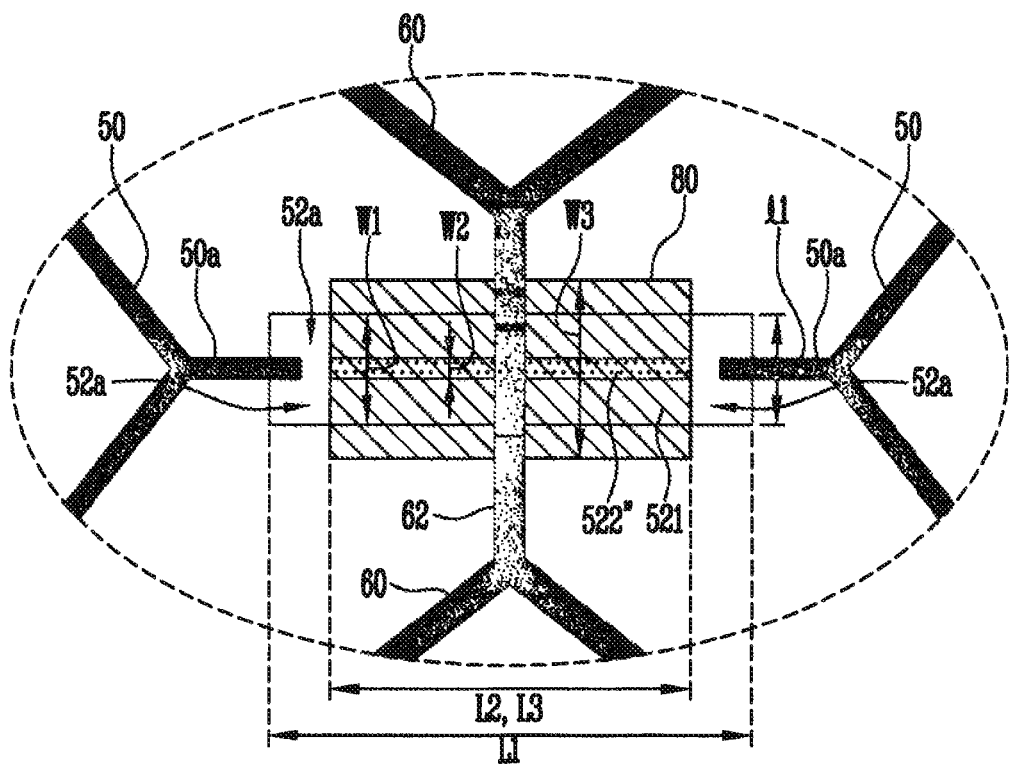

FIGS. 3A and 3B are plan views illustrating the specific region A of FIG. 1 according to other embodiments of the present invention.

The embodiments illustrated in FIGS. 3A and 3B are similar to the embodiment illustrated in FIG. 2A, except that the shapes of second bridge patterns 522' and 522" are different from each other and that of the second bridge pattern 522. Therefore, the same elements are denoted by the same reference numerals and description thereof will be omitted.

First, referring to FIG. 3A, the second bridge pattern 522' includes protrusions 522a that protrude or extend in a substantially vertical direction (e.g., the Y-axis direction) from respective ends of the second bridge pattern 522' to contact the protrusions 50a of the adjacent first sensing cells 50. Here, a length 11 of the protrusions 522a of the second bridge pattern 522' is substantially equal to the width W1 of the first bridge pattern 521.

In the embodiment shown in FIG. 2A, the second bridge pattern 522 is bar-shaped such that the protrusions 50a of the first sensing cells 50 may be electrically coupled to the second bridge pattern 522 only when the protrusions 50a of the first sensing cells 50 are positioned or located at the center of the first coupling pattern 52. However, in the embodiment shown in FIG. 3A, the protrusions 50a of the first sensing cells 50 may be coupled to the protrusions 522a of the second bridge pattern 522' although the positions of the protrusions 50a of the first sensing cells may be shifted due to the alignment tolerance (e.g., align allowance).

Therefore, the first sensing cells 50 contact (e.g., directly contact) the second bridge pattern 522' having low resistance and that forms part of the first coupling pattern 52 so that a signal may be rapidly transmitted.

Next, referring to FIG. 3B, a second bridge pattern 522" has a length L2 that is less than the length L1 of the first bridge pattern 521. Here, the length L2 of the second bridge pattern 522" may be substantially equal to the length L3 of the insulating layer 80 formed on or over the first coupling pattern 52.

That is, only the first bridge pattern 521 is exposed at respective ends 52a of the first coupling pattern 52, such that the protrusions 50a of the first sensing cells 50 may contact (e.g., directly contact) the first bridge pattern 521.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A flexible touch screen panel comprising:
    a flexible substrate;
    a plurality of first sensing cells on a surface of the substrate and arranged along a first direction, and a plurality of second sensing cells on the surface of the substrate and arranged along a second direction crossing the first direction; and
    a plurality of first coupling patterns configured to couple adjacent ones of the first sensing cells along the first direction, and a plurality of second coupling patterns configured to couple adjacent ones of the second sensing cells along the second direction, wherein the first coupling patterns have a lamination structure comprising at least two different materials, each of the at least two different materials of the lamination structure electrically coupling the adjacent ones of the first sensing cells, and the two different materials have different surface areas from each other.

2. The flexible touch screen panel in claim 1, wherein the first and second sensing cells comprise an opaque metal.

3. The flexible touch screen panel in claim 2, wherein the opaque metal comprises at least one low resistance metal of Ag, Al, Cu, Cr, and Ni, or a nanometal conductive layer.

4. The flexible touch screen panel in claim 1, wherein the flexible substrate comprises a low retardation film comprising one of a casted polycarbonate (PC) film or a cyclic polyolefin (COP) film.

5. The flexible touch screen panel in claim 1, wherein the flexible substrate comprises one of a polycarbonate (PC) film, an oriented polypropylene (OPP) film, or a polyvinyl alcohol (PVA) film having a phase difference.

6. A flexible touch screen panel comprising:
a flexible substrate;
a plurality of first sensing cells on a surface of the substrate and arranged along a first direction, and a plurality of second sensing cells on the surface of the substrate and arranged along a second direction crossing the first direction;
a plurality of first coupling patterns configured to couple adjacent ones of the first sensing cells along the first direction, each of the first coupling patterns comprising:
a first bridge pattern comprising a transparent, conductive material having a first width; and
a second bridge pattern on the first bridge pattern and comprising an opaque metal having a second width; and
a plurality of second coupling patterns configured to couple adjacent ones of the second sensing cells along the second direction,
wherein the first coupling patterns have a lamination structure comprising different materials.

7. The flexible touch screen panel in claim 6, wherein the second width of the second bridge pattern is less than the first width of the first bridge pattern.

8. The flexible touch screen panel in claim 6, wherein the second bridge pattern has substantially the same length as that of the first bridge pattern.

9. The flexible touch screen panel in claim 8, wherein the second bridge pattern further comprises protrusions extending along a direction substantially parallel to the second width of the second bridge pattern at both ends of the second bridge pattern.

10. The flexible touch screen panel in claim 9, wherein a length of each of the protrusions of the second bridge pattern is substantially the same as the first width of the first bridge pattern.

11. The flexible touch screen panel in claim 6, wherein an insulating layer is on at least a portion of one surface of each of the first coupling patterns such that both ends of each first coupling pattern are exposed.

12. The flexible touch screen panel in claim 11, wherein a length of the insulating layer is less than a length of the first bridge pattern, and a width of the insulating layer is greater than the first width of the first bridge pattern.

13. The flexible touch screen panel in claim 11, wherein both ends of each first coupling pattern contact protrusions of adjacent ones of the first sensing cells.

14. The flexible touch screen panel in claim 11, wherein the insulating layer insulates each of the second coupling patterns from a corresponding one of the first coupling patterns, and each of the second coupling patterns is coupled with corresponding ones of the second sensing cells.

15. The flexible touch screen panel in claim 11, wherein the second bridge pattern has substantially the same length as that of the insulating layer and is beneath the insulating layer.

* * * * *